(12) United States Patent
Albini et al.

(10) Patent No.: US 12,511,350 B2
(45) Date of Patent: Dec. 30, 2025

(54) SYSTEM, METHOD, AND COMPUTER PROGRAM FOR COMPUTING STRATEGIES FOR MODEL INFERENCES

(71) Applicant: JPMorgan Chase Bank, N.A., New York, NY (US)

(72) Inventors: Emanuele Albini, London (GB);
Freddy Lecue, Mamaroneck, NY (US);
Danial Dervovic, London (GB);
Saumitra Mishra, London (GB);
Daniele Magazzeni, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 575 days.

(21) Appl. No.: 18/087,062

(22) Filed: Dec. 22, 2022

(65) Prior Publication Data
US 2024/0211548 A1 Jun. 27, 2024

(51) Int. Cl.
*G06F 18/20* (2023.01)
*G06F 18/22* (2023.01)
*G06F 18/2321* (2023.01)

(52) U.S. Cl.
CPC ............ *G06F 18/285* (2023.01); *G06F 18/22* (2023.01); *G06F 18/2321* (2023.01)

(58) Field of Classification Search
None
See application file for complete search history.

(56) References Cited

U.S. PATENT DOCUMENTS

| | | | | |
|---|---|---|---|---|
| 11,526,444 B2 * | 12/2022 | Koch | ............... | G06F 12/0802 |
| 11,586,905 B2 * | 2/2023 | Song | ............... | G06N 3/045 |
| 11,777,808 B2 * | 10/2023 | Purigindla | ............... | H04L 41/12 |
| | | | | 709/223 |
| 11,983,777 B1 * | 5/2024 | Metzger | ............... | G06Q 40/08 |
| 12,122,053 B2 * | 10/2024 | Chen | ............... | B25J 9/163 |
| 12,197,429 B2 * | 1/2025 | Rios | ............... | H04L 67/141 |
| 2019/0370440 A1 * | 12/2019 | Gu | ............... | G06N 3/048 |
| 2020/0265329 A1 * | 8/2020 | Thomsen | ............... | G06N 20/10 |
| 2021/0110089 A1 * | 4/2021 | Chen | ............... | G06V 20/64 |
| 2021/0150042 A1 * | 5/2021 | Zhang | ............... | G06N 3/063 |
| 2022/0328063 A1 * | 10/2022 | Mariotti | ............... | H04L 51/046 |
| 2023/0177044 A1 * | 6/2023 | Rios | ............... | G06F 16/2433 |
| | | | | 707/769 |

* cited by examiner

*Primary Examiner* — Maikhanh Nguyen
(74) *Attorney, Agent, or Firm* — GREENBLUM & BERNSTEIN, P.L.C.

(57) ABSTRACT

Various methods, apparatuses/systems, and media for computing strategies for model inferences are disclosed. A processor generates background data from raw data and data sampling strategies associated with a particular security instrument; computes a model for each pair of raw data and machine learning algorithm; computes model explanation for each pair of the background data and the model; normalizes the computed model explanation by utilizing a predefined algorithm; computes a deep dense representation of each explanation based on the normalized explanation of the computed model; clusters the deep dense representation of each explanation; computes a deep dense representation of explanation of each predicted target data version associated with features recovery; compares the deep dense representation of each explanation with the deep dense representation of explanation of each predicted target data version; and computes a strategy of model selection for each target data version as output.

20 Claims, 7 Drawing Sheets

SYSTEM, METHOD, AND COMPUTER PROGRAM FOR COMPUTING STRATEGIES FOR MODEL INFERENCES

TECHNICAL FIELD

This disclosure generally relates to data processing, and, more particularly, to methods and apparatuses for implementing a platform, language, cloud, and database agnostic strategy computing module configured to compute strategies for comparing and selecting models to be used based on explanation to limit risks.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, data management, generating bond pricing, predicting stock pricing, and competitive analysis, to name but a few. Accurate and meaningful risk analysis may prove to be essential to superior investment performance, i.e., generating bond pricing, predicting stock pricing, etc. A standard definition of risk is the dispersion or volatility of returns for a single asset or a portfolio of assets, usually measured by standard deviation.

Standard portfolio theory, and modern analogues embodied in a range of value-at-risk (VaR) models, may require estimates of volatility and covariance between stock returns in order to generate a risk forecast. It is well known that using the naive sample covariance matrix may lead to unreliable risk forecasts simply because too many parameters have to be estimated from too little data. Conventional models may fail at any point of time due to: performance, cost, availability, data distribution change, etc. Moreover, a model that can generate bond pricing may not be suitable to utilize for predicting stock pricing. Conversely, a model for predicting stock pricing may not be suitable to utilize for generating bond pricing. Conventional tools may fail to evaluate gap and opportunities for models to be swapped at any time to limit risks, and may also fail to output differentiating factors, limitations among models, and recommendation of models to be used to limit the risks associated with investment performance.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic strategy computing module configured to compute strategies for comparing and selecting models to be used based on explanation to limit risks, but the disclosure is not limited thereto. For example, the present disclosure, through one or more of its various aspects, embodiments, and/or specific features or sub-components, provides, among other features, various systems, servers, devices, methods, media, programs, and platforms for implementing a platform, language, cloud, and database agnostic strategy computing module configured to generate output data that may include differentiating factors, demonstrating gaps, limitations among models, and recommendation of models to be used to limit the risks associated with investment performance, but the disclosure is not limited thereto.

According to exemplary embodiments, a method for computing strategies for model inferences by utilizing one or more processors along with allocated memory is disclosed. The method may include: generating background data from raw data and data sampling strategies associated with a particular security instrument; computing a model for each pair of raw data and machine learning algorithm; computing model explanation for each pair of the background data and the model; normalizing the computed model explanation by utilizing a predefined algorithm; computing a deep dense representation of each explanation based on the normalized explanation of the computed model; clustering the deep dense representation of each explanation; computing a deep dense representation of explanation of each predicted target data version associated with features recovery; comparing the deep dense representation of each explanation with the deep dense representation of explanation of each predicted target data version; and computing, based on comparing, a strategy of model selection for each target data version as output to be utilized for trading the particular security instrument.

According to exemplary embodiments, in clustering the deep dense representation of each explanation, the method may further include: computing clusters of explanations by clustering the deep dense representation of each explanation; reducing dimensionality of the computed clusters for visualization; and computing most common labels representing the deep explanation representation.

According to exemplary embodiments, the predefined algorithm for normalizing the computed model explanation may include one or more of the following algorithms: average, moving average, median, and weighted distance, but the disclosure is not limited thereto.

According to exemplary embodiments, the method may further include: computing a numerical representation of the explanation.

According to exemplary embodiments, wherein the numerical representation is a tensor representation.

According to exemplary embodiments, in computing the strategy of model selection for each target data version, the method may further include: applying each target data version in a deep representation space of the deep dense representation of each explanation with labels in the model and type of the machine learning algorithm; retrieving the closest cluster and the labels; and returning the closest cluster and the labels for computing strategy for model inference based on explanation fit.

According to exemplary embodiments, wherein the machine learning algorithm includes one or more of the following algorithms: decision tree, ensemble trees, neural network architectures, and liner regression, but the disclosure is not limited thereto.

According to exemplary embodiments, in features recovery, the method may further include: pre-processing the raw data and each version of the target data when it is determined that features or characteristics or dimensions of data are added or removed.

According to exemplary embodiments, when it is determined that the features or characteristics or dimensions are added, the method may further include: selecting features or characteristics or dimensions which are not in the target data, but are in the raw data; removing extra features or characteristics or dimensions from the target data except for the selected features or characteristics or dimensions which are not in the target data, but are in the raw data.

According to exemplary embodiments, when it is determined that the features or characteristics or dimensions are added, the method may further include: transforming the raw data by filling the raw data with the added features or characteristics or dimensions; finding closest points in the raw data; and assigning similar features values or characteristics values or dimensions values to the closest points as target data.

According to exemplary embodiments, when it is determined that the features or characteristics or dimensions are added, the method may further include: transforming the raw data by filling the raw data with the added features or characteristics or dimensions; finding closest points in the raw data; and assigning dummy value to all non-closest points in the raw data.

According to exemplary embodiments, when it is determined that the features or characteristics or dimensions are removed, the method may further include: selecting features or characteristics or dimensions that are not in the target data, but are in the raw data; and training a model from the raw data that predicts the features or characteristics or dimensions that are not in the target data, but are in the raw data.

According to exemplary embodiments, a system for computing strategies for model inferences is disclosed. The system may include: a processor; and a memory operatively connected to the processor via a communication interface, the memory storing computer readable instructions, when executed, may cause the processor to: generate background data from raw data and data sampling strategies associated with a particular security instrument; compute a model for each pair of raw data and machine learning algorithm; compute model explanation for each pair of the background data and the model; normalize the computed model explanation by utilizing a predefined algorithm; compute a deep dense representation of each explanation based on the normalized explanation of the computed model; cluster the deep dense representation of each explanation; compute a deep dense representation of explanation of each predicted target data version associated with features recovery; compare the deep dense representation of each explanation with the deep dense representation of explanation of each predicted target data version; and compute, based on comparing, a strategy of model selection for each target data version as output to be utilized for trading the particular security instrument.

According to exemplary embodiments, in clustering the deep dense representation of each explanation, the processor may be further configured to: compute clusters of explanations by clustering the deep dense representation of each explanation; reduce dimensionality of the computed clusters for visualization; and compute most common labels representing the deep explanation representation.

According to exemplary embodiments, the processor may be further configured to: compute a numerical representation of the explanation.

According to exemplary embodiments, in computing the strategy of model selection for each target data version, the processor may be further configured to: apply each target data version in a deep representation space of the deep dense representation of each explanation with labels in the model and type of the machine learning algorithm; retrieve the closest cluster and the labels; and return the closest cluster and the labels for computing strategy for model inference based on explanation fit.

According to exemplary embodiments, in features recovery, the processor may be further configured to: pre-process the raw data and each version of the target data when it is determined that features or characteristics or dimensions of data are added or removed.

According to exemplary embodiments, when it is determined that the features or characteristics or dimensions are added, the processor may be further configured to: select features or characteristics or dimensions which are not in the target data, but are in the raw data; remove extra features or characteristics or dimensions from the target data except for the selected features or characteristics or dimensions which are not in the target data, but are in the raw data.

According to exemplary embodiments, when it is determined that the features or characteristics or dimensions are added, the processor may be further configured to: transform the raw data by filling the raw data with the added features or characteristics or dimensions; find closest points in the raw data; and assign similar features values or characteristics values or dimensions values to the closest points as target data.

According to exemplary embodiments, when it is determined that the features or characteristics or dimensions are added, the processor may be further configured to: transform the raw data by filling the raw data with the added features or characteristics or dimensions; find closest points in the raw data; and assign dummy value to all non-closest points in the raw data.

According to exemplary embodiments, when it is determined that the features or characteristics or dimensions are removed, the processor may be further configured to: select features or characteristics or dimensions that are not in the target data, but are in the raw data; and train a model from the raw data that predicts the features or characteristics or dimensions that are not in the target data, but are in the raw data.

According to exemplary embodiments, a non-transitory computer readable medium configured to store instructions for computing strategies for model inferences, the instructions, when executed, may cause a processor to perform the following: generating background data from raw data and data sampling strategies associated with a particular security instrument; computing a model for each pair of raw data and machine learning algorithm; computing model explanation for each pair of the background data and the model; normalizing the computed model explanation by utilizing a predefined algorithm; computing a deep dense representation of each explanation based on the normalized explanation of the computed model; clustering the deep dense representation of each explanation; computing a deep dense representation of explanation of each predicted target data version associated with features recovery; comparing the deep dense representation of each explanation with the deep dense representation of explanation of each predicted target data version; and computing, based on comparing, a strategy of model selection for each target data version as output to be utilized for trading the particular security instrument.

According to exemplary embodiments, in clustering the deep dense representation of each explanation, the instructions, when executed, may cause the processor to further perform the following: computing clusters of explanations by clustering the deep dense representation of each explanation; reducing dimensionality of the computed clusters for visualization; and computing most common labels representing the deep explanation representation.

According to exemplary embodiments, the instructions, when executed, may cause the processor to further perform the following: computing a numerical representation of the explanation.

According to exemplary embodiments, in computing the strategy of model selection for each target data version, the instructions, when executed, may cause the processor to further perform the following: applying each target data version in a deep representation space of the deep dense representation of each explanation with labels in the model and type of the machine learning algorithm; retrieving the closest cluster and the labels; and returning the closest cluster and the labels for computing strategy for model inference based on explanation fit.

According to exemplary embodiments, in features recovery, the instructions, when executed, may cause the processor to further perform the following: pre-processing the raw data and each version of the target data when it is determined that features or characteristics or dimensions of data are added or removed.

According to exemplary embodiments, when it is determined that the features or characteristics or dimensions are added, the instructions, when executed, may cause the processor to further perform the following: selecting features or characteristics or dimensions which are not in the target data, but are in the raw data; removing extra features or characteristics or dimensions from the target data except for the selected features or characteristics or dimensions which are not in the target data, but are in the raw data.

According to exemplary embodiments, when it is determined that the features or characteristics or dimensions are added, the instructions, when executed, may cause the processor to further perform the following: transforming the raw data by filling the raw data with the added features or characteristics or dimensions; finding closest points in the raw data; and assigning similar features values or characteristics values or dimensions values to the closest points as target data.

According to exemplary embodiments, when it is determined that the features or characteristics or dimensions are added, the instructions, when executed, may cause the processor to further perform the following: transforming the raw data by filling the raw data with the added features or characteristics or dimensions; finding closest points in the raw data; and assigning dummy value to all non-closest points in the raw data.

According to exemplary embodiments, when it is determined that the features or characteristics or dimensions are removed, the instructions, when executed, may cause the processor to further perform the following: selecting features or characteristics or dimensions that are not in the target data, but are in the raw data; and training a model from the raw data that predicts the features or characteristics or dimensions that are not in the target data, but are in the raw data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
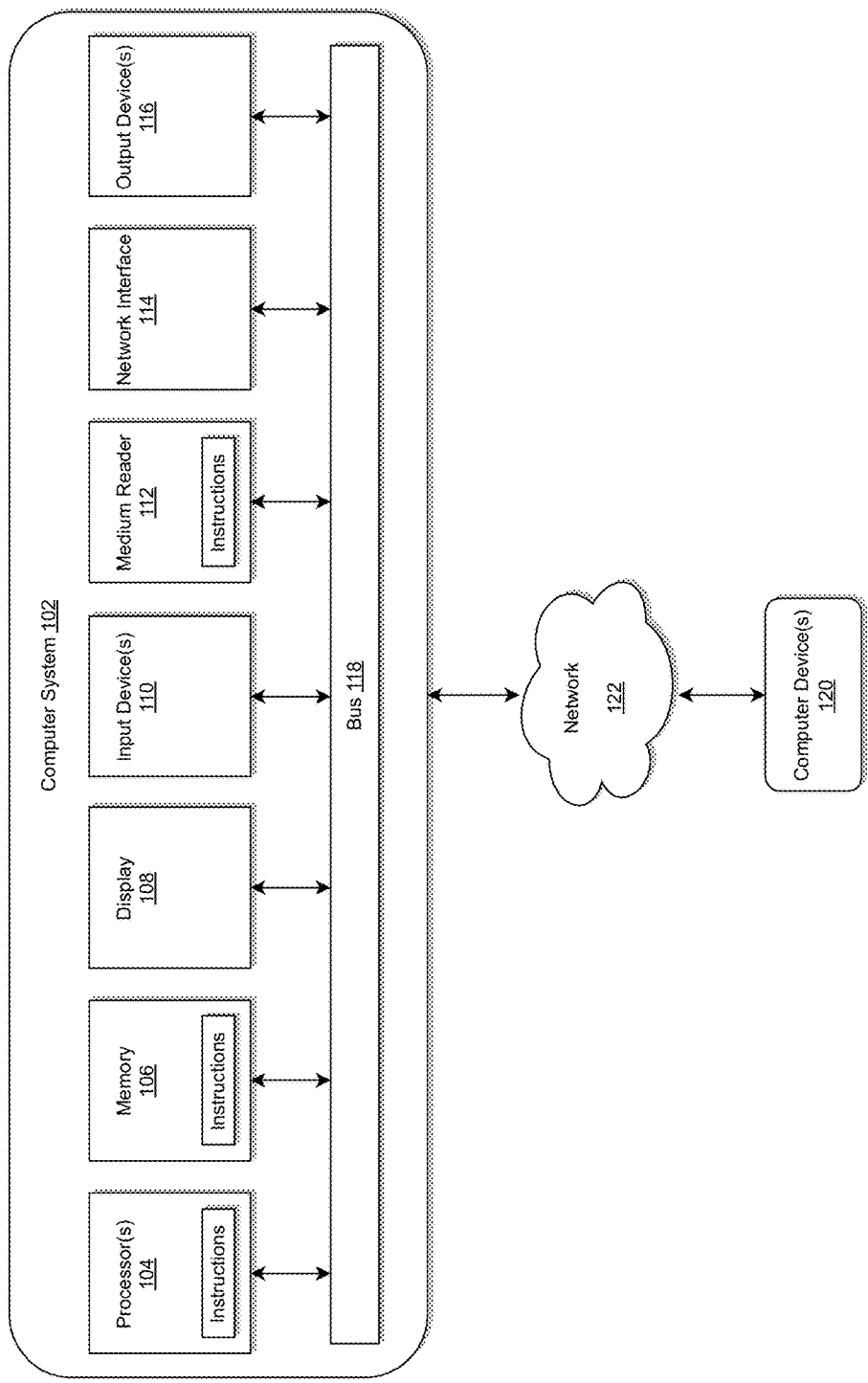
FIG. 1 illustrates a computer system for implementing a platform, language, database, and cloud agnostic strategy computing module configured to compute strategies for comparing and selecting models to be used based on explanation to limit risks in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic strategy computing module configured to compute strategies for comparing and selecting models to be used based on explanation to limit risks in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the strategy computing module may be platform, language, database, and cloud agnostic that may allow for consistent easy orchestration and passing of data through various components to output a desired result regardless of platform, language, database, and cloud environment. Since the disclosed process, according to exemplary embodiments, is platform, language, database, and cloud agnostic, the strategy computing module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
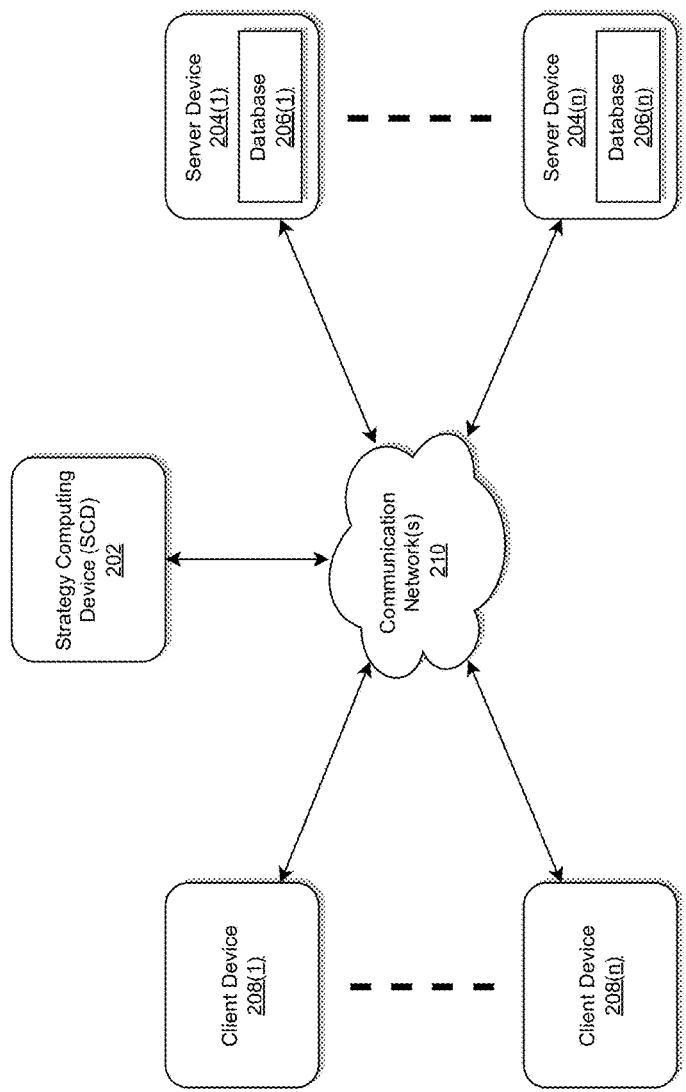
FIG. 2 illustrates an exemplary diagram of a network environment with a platform, language, database, and cloud agnostic strategy computing device in accordance with an exemplary embodiment.

Referring to FIG. 2, a schematic of an exemplary network environment 200 for implementing a language, platform, database, and cloud agnostic strategy computing device (SCD) of the instant disclosure is illustrated.

According to exemplary embodiments, the above-described problems associated with conventional tools may be overcome by implementing an SCD 202 as illustrated in FIG. 2 that may be configured for implementing a platform, language, cloud, and database agnostic strategy computing module configured to compute strategies for comparing and selecting models to be used based on explanation to limit risks, but the disclosure is not limited thereto. For example, according to exemplary embodiments, the above-described problems associated with conventional tools may be overcome by implementing an SCD 202 as illustrated in FIG. 2 that may be configured for implementing a platform, language, cloud, and database agnostic strategy computing module configured to generate output data that may include differentiating factors, demonstrating gaps, limitations among models, and recommendation of models to be used to limit the risks associated with investment performance, but the disclosure is not limited thereto.

The SCD 202 may be the same or similar to the computer system 102 as described with respect to FIG. 1.

The SCD 202 may store one or more applications that can include executable instructions that, when executed by the SCD 202, cause the SCD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCD 202 itself, may be located in virtual server(s) running in a cloud-based computing environment rather than being tied to one or more specific physical network computing devices. Also, the application(s) may be running in one or more virtual machines (VMs) executing on the SCD 202. Additionally, in one or more embodiments of this technology, virtual machine(s) running on the SCD 202 may be managed or supervised by a hypervisor.

In the network environment 200 of FIG. 2, the SCD 202 is coupled to a plurality of server devices 204(1)-204($n$) that hosts a plurality of databases 206(1)-206($n$), and also to a plurality of client devices 208(1)-208($n$) via communication network(s) 210. A communication interface of the SCD 202, such as the network interface 114 of the computer system 102 of FIG. 1, operatively couples and communicates between the SCD 202, the server devices 204(1)-204($n$), and/or the client devices 208(1)-208($n$), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCD 202, the server devices 204(1)-204($n$), and/or the client devices 208(1)-208($n$) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCD 202 may be a standalone device or integrated with one or more other devices or apparatuses, such as one or more of the server devices 204(1)-204($n$), for example. In one particular example, the SCD 202 may be hosted by one of the server devices 204(1)-204($n$), and other arrangements are also possible. Moreover, one or more of the devices of the SCD 202 may be in the same or a different communication network including one or more public, private, or cloud networks, for example.

The plurality of server devices 204(1)-204($n$) may be the same or similar to the computer system 102 or the computer device 120 as described with respect to FIG. 1, including any features or combination of features described with respect thereto. For example, any of the server devices 204(1)-204($n$) may include, among other features, one or more processors, a memory, and a communication interface, which are coupled together by a bus or other communication link, although other numbers and/or types of network devices may be used. The server devices 204(1)-204($n$) in this example may process requests received from the SCD 202 via the communication network(s) 210 according to the HTTP-based and/or JavaScript Object Notation (JSON) protocol, for example, although other protocols may also be used.

The server devices 204(1)-204($n$) may be hardware or software or may represent a system with multiple servers in a pool, which may include internal or external networks. The server devices 204(1)-204($n$) hosts the databases 206(1)-206($n$) that are configured to store metadata sets, data quality rules, and newly generated data.

Although the server devices 204(1)-204($n$) are illustrated as single devices, one or more actions of each of the server devices 204(1)-204($n$) may be distributed across one or more distinct network computing devices that together comprise one or more of the server devices 204(1)-204($n$). Moreover, the server devices 204(1)-204($n$) are not limited to a particular configuration. Thus, the server devices 204(1)-204($n$) may contain a plurality of network computing devices that operate using a master/slave approach, whereby one of the network computing devices of the server devices 204(1)-204($n$) operates to manage and/or otherwise coordinate operations of the other network computing devices.

The server devices 204(1)-204($n$) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208($n$) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204($n$) or other client devices 208(1)-208($n$).

According to exemplary embodiments, the client devices 208(1)-208($n$) in this example may include any type of computing device that can facilitate the implementation of the SCD 202 that may efficiently provide a platform for implementing a platform, language, cloud, and database agnostic strategy computing module configured to compute strategies for comparing and selecting models to be used based on explanation to limit risks, i.e., in generating bond pricing or in predicting stock pricing, but the disclosure is not limited thereto. According to exemplary embodiments, the client devices 208(1)-208($n$) in this example may include any type of computing device that can facilitate the implementation of the SCD 202 that may efficiently provide a platform for implementing a platform, language, cloud, and database agnostic strategy computing module configured to generate output data that may include differentiating factors, demonstrating gaps, limitations among models, and recommendation of models to be used to limit the risks associated with investment performance, but the disclosure is not limited thereto.

The client devices 208(1)-208($n$) may run interface applications, such as standard web browsers or standalone client applications, which may provide an interface to communicate with the SCD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SCD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SCD 202, the server devices 204(1)-204(n), or the client devices 208(1)-208(n), for example, may be configured to operate as virtual instances on the same physical machine. For example, one or more of the SCD 202, the server devices 204(1)-204(n), or the client devices 208(1)-208(n) may operate on the same physical device rather than as separate devices communicating through communication network(s) 210. Additionally, there may be more or fewer SCDs 202, server devices 204(1)-204(n), or client devices 208(1)-208(n) than illustrated in FIG. 2. According to exemplary embodiments, the SCD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
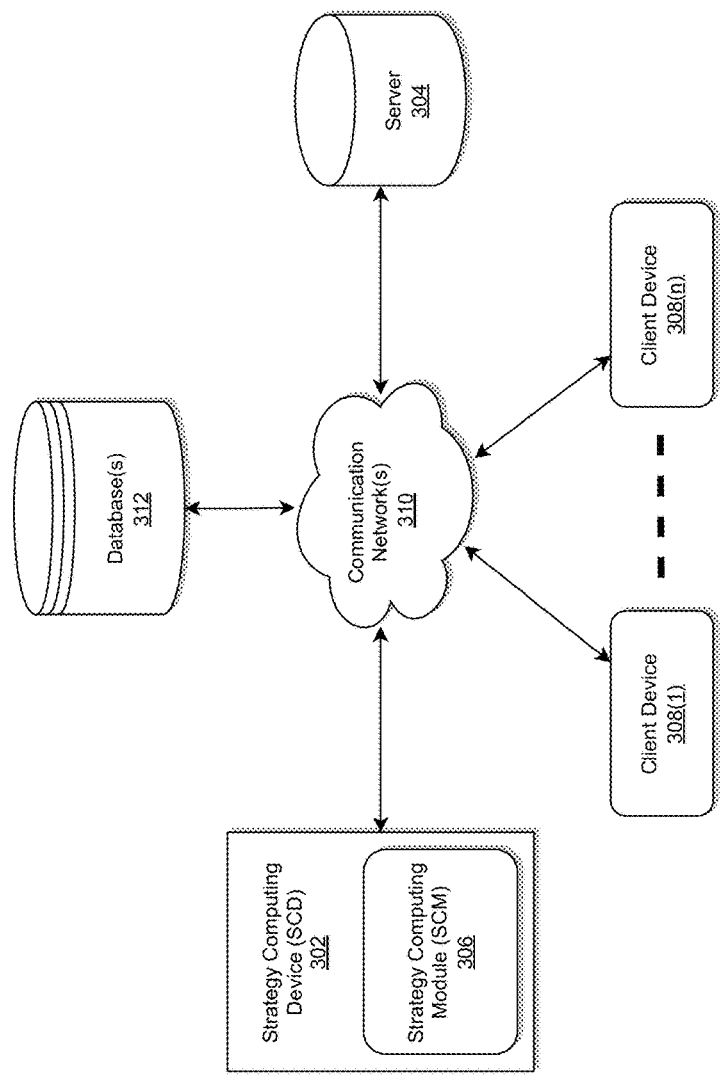
FIG. 3 illustrates a system diagram for implementing a platform, language, database, and cloud agnostic strategy computing device having a platform, language, database, and cloud agnostic strategy computing module in accordance with an exemplary embodiment.

FIG. 3 illustrates a system diagram for implementing a platform, language, and cloud agnostic SCD having a platform, language, database, and cloud agnostic strategy computing module (SCM) in accordance with an exemplary embodiment.

As illustrated in FIG. 3, the system 300 may include an SCD 302 within which an SCM 306 is embedded, a server 304, a database(s) 312, a plurality of client devices 308(1) . . . 308(n), and a communication network 310.

According to exemplary embodiments, the SCD 302 including the SCM 306 may be connected to the server 304, and the database(s) 312 via the communication network 310. The SCD 302 may also be connected to the plurality of client devices 308(1) . . . 308(n) via the communication network 310, but the disclosure is not limited thereto.

According to exemplary embodiment, the SCD 302 is described and shown in FIG. 3 as including the SCM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SCM 306 may be configured to receive real-time feed of data from the plurality of client devices 308(1) . . . 308(n) and secondary sources via the communication network 310.

As may be described below, the SCM 306 may be configured to: generate background data from raw data and data sampling strategies associated with a particular security instrument; compute a model for each pair of raw data and machine learning algorithm; compute model explanation for each pair of the background data and the model; normalize the computed model explanation by utilizing a predefined algorithm; compute a deep dense representation of each explanation based on the normalized explanation of the computed model; cluster the deep dense representation of each explanation; compute a deep dense representation of explanation of each predicted target data version associated with features recovery; compare the deep dense representation of each explanation with the deep dense representation of explanation of each predicted target data version; and compute, based on comparing, a strategy of model selection for each target data version as output to be utilized for trading the particular security instrument, but the disclosure is not limited thereto.

The plurality of client devices 308(1) . . . 308(n) are illustrated as being in communication with the SCD 302. In this regard, the plurality of client devices 308(1) . . . 308(n) may be "clients" (e.g., customers) of the SCD 302 and are described herein as such. Nevertheless, it is to be known and understood that the plurality of client devices 308(1) . . . 308(n) need not necessarily be "clients" of the SCD 302, or any entity described in association therewith herein. Any additional or alternative relationship may exist between either or both of the plurality of client devices 308(1) . . . 308(n) and the SCD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SCD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SCD 302 may be the same or similar to the SCD 202 as described with respect to FIG. 2, including any features or combination of features described with respect thereto.

Figure 4:
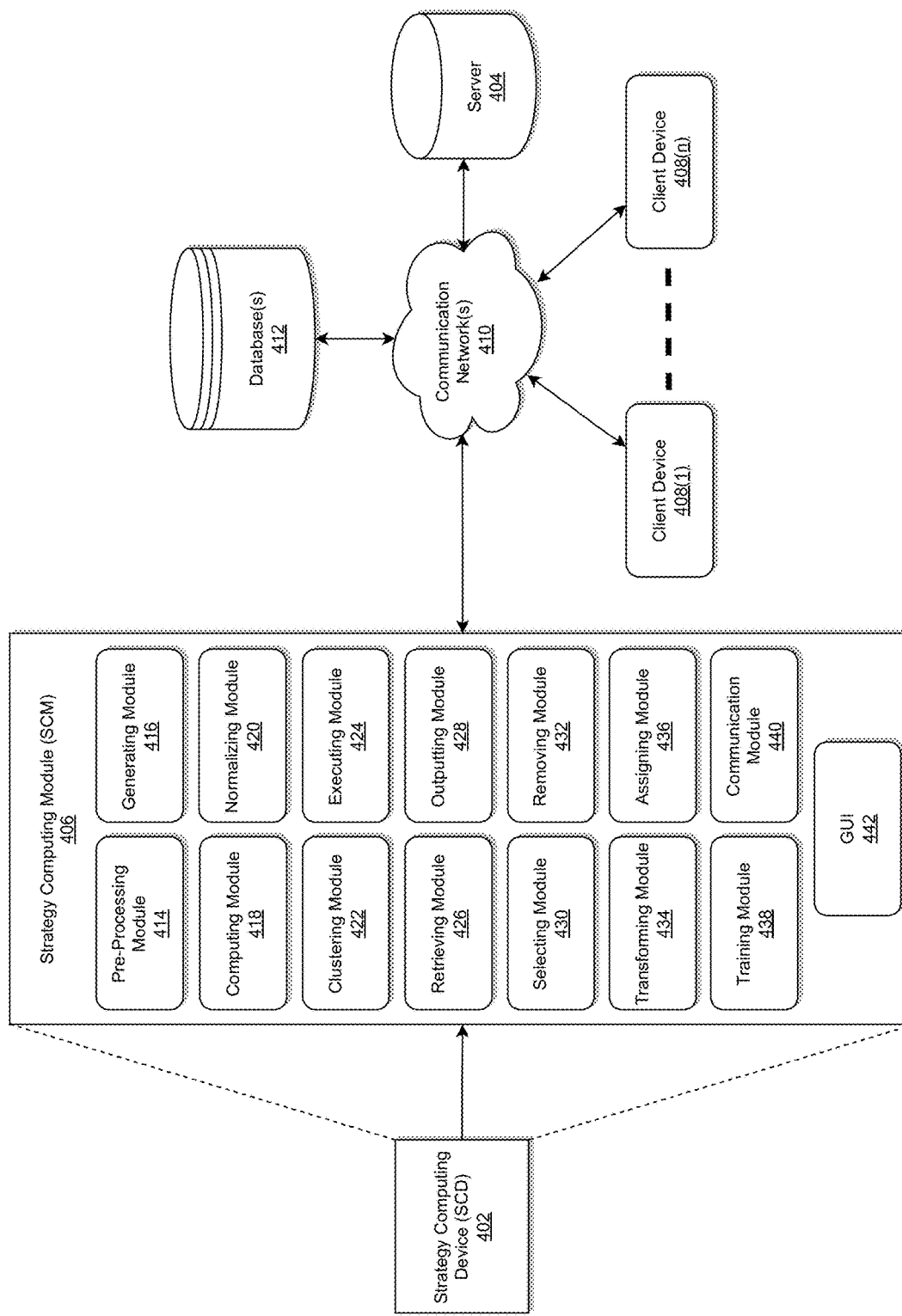
FIG. 4 illustrates a system diagram for implementing a platform, language, database, and cloud agnostic strategy computing module of FIG. 3 in accordance with an exemplary embodiment.

FIG. 4 illustrates a system diagram for implementing a platform, language, database, and cloud agnostic SCM of FIG. 3 in accordance with an exemplary embodiment.

According to exemplary embodiments, the system 400 may include a platform, language, database, and cloud agnostic SCD 402 within which a platform, language, database, and cloud agnostic SCM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the SCD 402 including the SCM 406 may be connected to the server 404 and the database(s) 412 via the communication network 410. The SCD 402 may also be connected to the plurality of client devices 408(1)-408(n) via the communication network 410, but the disclosure is not limited thereto. The SCM 406, the server 404, the plurality of client devices 408(1)-408(n), the database(s) 412, the communication network 410 as illustrated in FIG. 4 may be the same or similar to the SCM 306, the server 304, the plurality of client devices 308(1)-308(n), the database(s) 312, the communication network 310, respectively, as illustrated in FIG. 3.

According to exemplary embodiments, as illustrated in FIG. 4, the SCM 406 may include a pre-processing module 414, a generating module 416, a computing module 418, a normalizing module 420, a clustering module 422, an executing module 424, a retrieving module 426, an outputting module 428, a selecting module 430, a removing module 432, a transforming module 434, an assigning module 436, a training module 438, a communication module 440, and a graphical user interface (GUI) 442. According to exemplary embodiments, interactions and data exchange among these modules included in the SCM 406 provide the advantageous effects of the disclosed invention. Functionalities of each module of FIG. 4 may be described in detail below with reference to FIGS. 4-6.

According to exemplary embodiments, each of the pre-processing module 414, the generating module 416, the computing module 418, the normalizing module 420, the clustering module 422, the executing module 424, the retrieving module 426, the outputting module 428, the selecting module 430, the removing module 432, the transforming module 434, the assigning module 436, the training module 438, and the communication module 440 of the SCM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the pre-processing module 414, the generating module 416, the computing module 418, the normalizing module 420, the clustering module 422, the executing module 424, the retrieving module 426, the outputting module 428, the selecting module 430, the removing module 432, the transforming module 434, the assigning module 436, the training module 438, and the communication module 440 of the SCM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the pre-processing module 414, the generating module 416, the computing module 418, the normalizing module 420, the clustering module 422, the executing module 424, the retrieving module 426, the outputting module 428, the selecting module 430, the removing module 432, the transforming module 434, the assigning module 436, the training module 438, and the communication module 440 of the SCM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the pre-processing module 414, the generating module 416, the computing module 418, the normalizing module 420, the clustering module 422, the executing module 424, the retrieving module 426, the outputting module 428, the selecting module 430, the removing module 432, the transforming module 434, the assigning module 436, the training module 438, and the communication module 440 of the SCM 406 of FIG. 4 may be called via corresponding API.

According to exemplary embodiments, the process implemented by the SCM 406 may be executed via the communication module 440 and the communication network 410, which may comprise plural networks as described above. For example, in an exemplary embodiment, the various components of the SCM 406 may communicate with the server 404, and the database(s) 412 via the communication module 440 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

For an exemplary embodiment, in generating bond pricing or predicting stock pricing, the SCM 406 may utilize time series of stock history, sampling strategies, and predictive algorithms as input. The SCM 406 than outputs differentiating factors, demonstrating gaps, limitations among models; and recommendation of models to be used to limit risks.

According to exemplary embodiments, data sampling strategies may include: strategy 1: select the first 5; strategy 2: select random 5; strategy 3: select 5 with features A=0; . . . and strategy n: select 5 closest ones, but the disclosure is not limited thereto.

According to exemplary embodiments, raw data corresponding to time series of security instrument (i.e., bond, stock, etc., but the disclosure is not limited thereto) history may be tabular data, image, or text. For example, illustration with tabular data may include: X1 (A=0, B=1, C=8, D=9); X2 (A=0, B=30, C=1, D=2); X3 (A=0, B=3, C=8, D=−31); . . . ; and Xn (A=7, B=2, C=6, D=5).

According to exemplary embodiments, the machine learning algorithm may include one or more of the following algorithms: decision tree, ensemble trees, neural network architectures, and liner regression, but the disclosure is not limited thereto.

According to exemplary embodiments, explanation technique may include: features attribution; i.e., SHAP (SHapley Additive explanations), or CO-SHAP; and feature importance explanation technique, but the disclosure is not limited thereto.

According to exemplary embodiments, in versioned target data (tabular data, image, text, etc.), illustration with tabular data for Version 1 may include X (A=90, B=81, C=18, D=59, and Z=11); and illustration with tabular data for Version 2 may include X1 (A=0, B=1, C=8, D=9)

According to exemplary embodiments, the pre-processing module 414 may be configured to apply corresponding algorithm to pre-process the raw data (i.e., tabular data, image, text) aiming at computing the model for each pair (raw data, machine learning algorithm and storing in a list. For example, for the purpose of following descriptions with respect to FIGS. 4, 5A, 5B, 5C, and 5D, the tree-based model may be represented as M1, ensemble tree-based model may be represented as M2, neural network model may be represented as M3, and liner model may be represented as M4.

According to exemplary embodiments, the generating module 416 may be configured to generate background data (Step 1) from raw data and data sampling strategies associated with a particular security instrument. For example, the computing module 418 may be configured to compute different samples of data from the initial raw data and storing the content in a list. According to exemplary embodiments, the generated background data from strategy 1 as described above may be represented as BDS1=X1, X7, X9, X22, X4; the generated background data from strategy 2 as described above may be represented as BDS2=X0, X9, X10, X1, X8; the generated background data from strategy 3 as described above may be represented as BDS3=X33, X11, X89, X3, X1; . . . ; and the generated background data from strategy n as described above may be represented as BDSn=X0, X4, X11, X9, X98, but the disclosure is not limited thereto.

Thus, according to exemplary embodiments, the computing module 418 may be configured to compute a model for each pair of raw data and machine learning algorithm; and compute model explanation (Step 2) for each pair of the background data and the model. For example, the computing module 418 may be configured to compute the model explanation XAI (for instance features attribution) for each pair (background data, model). A set of explanations may include: XAI (BDS1, M1)=(A=-1, B=-3, D=1); XAI (BDS1, M2)=(A=-6, B=0, D=0); . . . ; XAI (BDSn, M4)= (A=3, B=4, D=13), but the disclosure is not limited thereto.

According to exemplary embodiments, the normalizing module 420 may be configured to normalize the computed model explanation (Step 3) by utilizing a predefined algorithm, i.e., average m moving average, median, weighted distance, etc., but the disclosure is not limited thereto. For example, the computing module 418 may compute a numerical representation of explanation (i.e., output of the step of computing model explanation XAI as mentioned above. Different explanation technique may be needed for different normalization technique. The following is an illustration for features importance. The process implemented by the normalizing module 420 may include as follows: for each feature in explanation, computing average of explanation for this feature; for each features F in explanation, computing new feature values F as (F-average of explanation for this feature)/average of explanation for this feature. Exemplary explanation of normalization may include: XAI (BDS1, M1)=(A=-0.1, B=-0.3, D=1); XAI (BDS1, M2)= (A=-0.4, B=0, D=0); . . . ; XAI (BDSn, M4)=(A=0.3, B=0.55, D=0.3), but the disclosure is not limited thereto.

The computing module 418 may be configured to compute a deep dense representation of each explanation (Step 4) based on the normalized explanation of the computed model. Alternative approaches may include any dimensionality reduction approaches such as PCA (Principal Component Analysis). This step may be required if explanations are sparse, i.e., lots of similar values, zeros, etc. The following exemplary process may be implemented by the computing module 418 for computing a unique latent-space representation of each explanation based on the normalized explanation from Step 3: for each model and its explanation, designing an auto-encoder neural network architecture that fits the data, training the auto-encoder neural network with normalized explanation as input to learn to reproduce the input of the model, return the features of the dense layer (i.e., the n-1/n-2 layer) in the architecture; outputting a deep dense representation of each explanation, represented as a multi-dimensional array (see FIG. 5A).

Figure 5A:
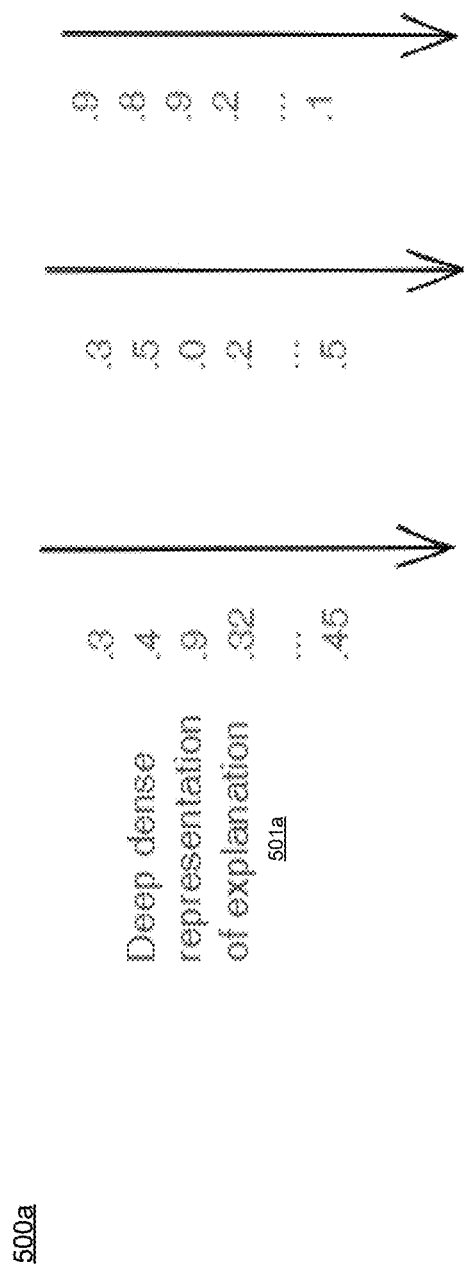
FIG. 5A illustrates an exemplary graphical user interface that illustrates a deep dense representation of explanation as implemented by the platform, language, database, and cloud agnostic strategy computing module of FIG. 4 in accordance with an exemplary embodiment.

FIG. 5A illustrates an exemplary graphical user interface 500a that illustrates a deep dense representation of explanation chart 501a as implemented by the platform, language, database, and cloud agnostic SCM 406 of FIG. 4 in accordance with an exemplary embodiment. As illustrated in FIG. 5A, the deep dense representation of explanation 501a may include three sets of numerical values. For example, set 1 may include the following numerical values: 0.3, 0.4, 0.9, 0.32, . . . , 0.45, but the disclosure is not limited thereto. For example, set 2 may include the following numerical values: 0.3, 0.5, 0.0, 0.2, . . . , 0.5, but the disclosure is not limited thereto. For example, set 3 may include the following numerical values: 0.9, 0.8, 0.9, 0.2, . . . , 0.1, but the disclosure is not limited thereto.

According to exemplary embodiments, the clustering module 422 may be configured to cluster (Step 5) the deep dense representation of each explanation; compute a deep dense representation of explanation of each predicted target data version associated with features recovery. Clusters of explanations may be computed by clustering the deep dense representation of explanations. Clustering process may also include reducing their dimensionality for visualization. An exemplary process of clustering may include; computing clusters, reduce dimensionality, computing most common labels representing the deep explanation representation.

According to exemplary embodiments, the pre-processing module 414 may be further configured to perform a pre-processing step for pre-processing data in case features or characteristics or dimensions of data are added or removed. The pre-processing step may include the versioned target data (tabular data, image, text) and the raw data (tabular, image, text) as input.

For example, according to exemplary embodiments, when it is determined that the features or characteristics or dimensions are added, the selecting module 430 may be configured to select features or characteristics or dimensions which are not in the target data, but are in the raw data; the removing module 432 may be configured to remove extra features or characteristics or dimensions from the target data except for the selected features or characteristics or dimensions which are not in the target data, but are in the raw data.

According to exemplary embodiments, when it is determined that the features or characteristics or dimensions are added, the transforming module 434 may be configured to transform the raw data by filling the raw data with the added features or characteristics or dimensions; the executing module 424 may be configured to find closest points in the raw data; and the assigning module 436 may be configured to assign similar features values or characteristics values or dimensions values to the closest points as target data.

According to exemplary embodiments, when it is determined that the features or characteristics or dimensions are added, the transforming module 434 may be further configured to transform the raw data by filling the raw data with the added features or characteristics or dimensions; the executing module 424 may be configured to find closest points in the raw data; and the assigning module 436 may be further configured to assign dummy value to all non-closest points in the raw data.

According to exemplary embodiments, when it is determined that the features or characteristics or dimensions are removed, the selecting module 430 may be further configured to select features or characteristics or dimensions that are not in the target data, but are in the raw data; and the training module 438 may be configured to train a model from the raw data that predicts the features or characteristics or dimensions that are not in the target data, but are in the raw data.

Exemplary illustration with tabular data for version 1 may include: X (A=90, B=81, C=18, D=59). Exemplary illustration with tabular data for version 2 may include: X1 (A=0, B=1, C=8, D=9). Step 2, Step 3, and Step 4 as discussed above are applied to these tabular data version 1 and version 2 to obtain a deep explanation representation (see FIG. 5B).

Figure 5B:
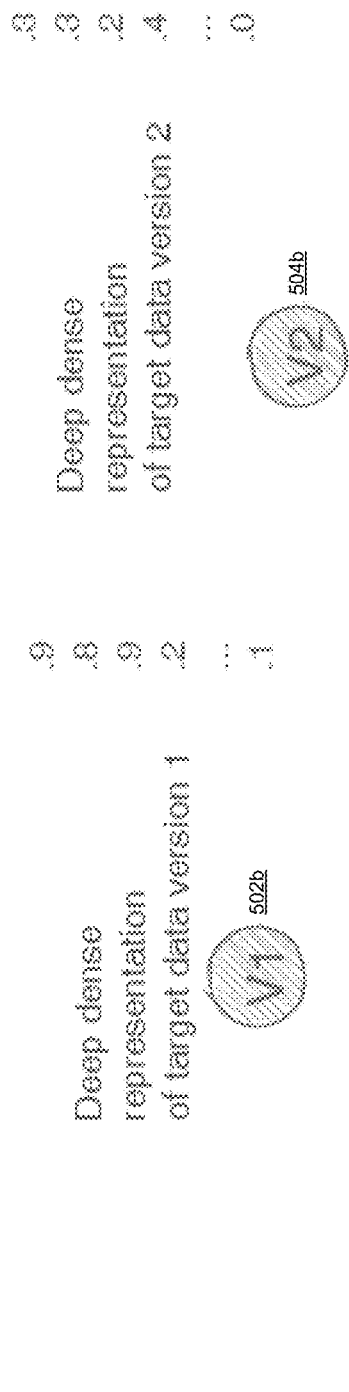
FIG. 5B illustrates an exemplary graphical user interface that illustrates deep dense representation of target data versions as implemented by the platform, language, database, and cloud agnostic strategy computing module of FIG. 4 in accordance with an exemplary embodiment.

According to exemplary embodiments, FIG. 5B illustrates an exemplary graphical user interface 500b that illustrates deep dense representation of target data versions charts as implemented by the platform, language, database, and cloud agnostic SCM 406 of FIG. 4 in accordance with an exemplary embodiment. As illustrated in FIG. 5B, the charts illustrate a deep dense representation of target data version 1 (V1) 502b and a deep dense representation of target data version 2 (V2) 504b. Numerical values as represented by the V1 502b may include 0.9, 0.8, 0.9, 0.2, . . . , and 0.1, but the disclosure is not limited thereto. Numerical values as represented by the V2 504b may include 0.3, 0.3, 0.2, 0.4, . . . , and 0.0, but the disclosure is not limited thereto.

According to exemplary embodiments, the executing module 424 may be further configured to compare the deep dense representation of each explanation with the deep dense representation of explanation of each predicted target data version; and the computing module 418 may be further configured to compute, based on comparing, a strategy of model selection for each target data version as output to be utilized for trading the particular security instrument.

Figure 5C:
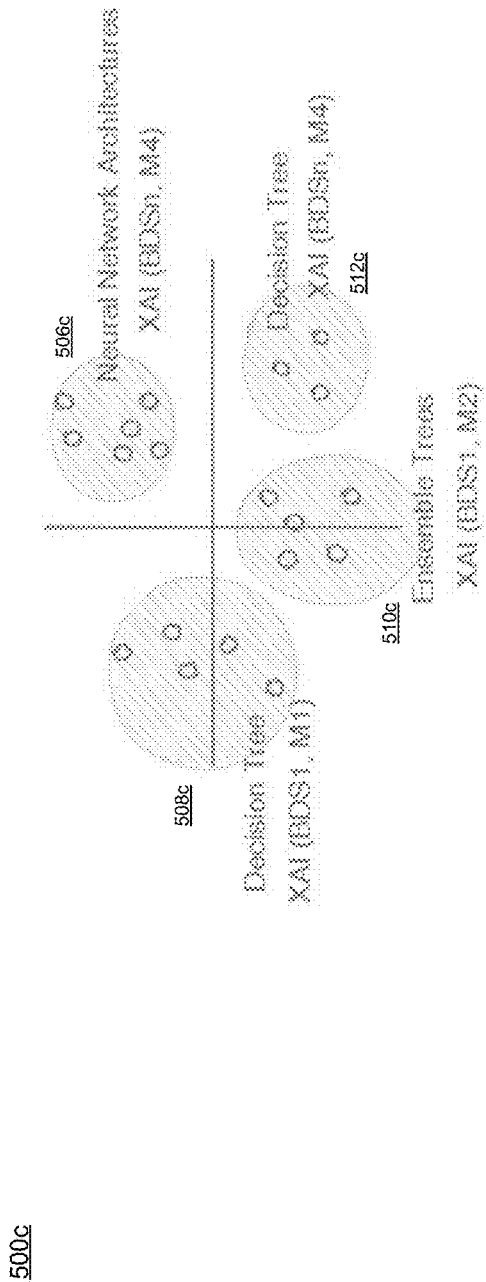
FIG. 5C illustrates an exemplary graphical user interface that illustrates deep dense representation of explanation with labels in model and algorithm type as implemented by the platform, language, database, and cloud agnostic strategy computing module of FIG. 4 in accordance with an exemplary embodiment.

For example, FIG. 5C illustrates an exemplary graphical user interface 500c that illustrates deep dense representation of explanation with labels in model and algorithm type as implemented by the platform, language, database, and cloud agnostic SCM 406 of FIG. 4 in accordance with an exemplary embodiment. For example, the SCM 406 may be configured to cluster the deep dense representation of explanation 501a as illustrated in FIG. 5A and generate a deep dense representation of explanation with labels in model and algorithm type. For example, as illustrated in FIG. 5C, cluster 506c illustrates neural network architectures as model and algorithm type and XAI (BDSn, M4) as representation of normalized explanation; cluster 508c illustrates decision tree as model and algorithm type and XAI (BDS1, M1) as representation of normalized explanation; cluster 510c illustrates ensemble trees as model and algorithm type and XAI (BDS1, M2) as representation of normalized explanation; and cluster 512c illustrates decision tree as model and algorithm type and XAI (BDS1, M2) as representation of normalized explanation.

Figure 5D:
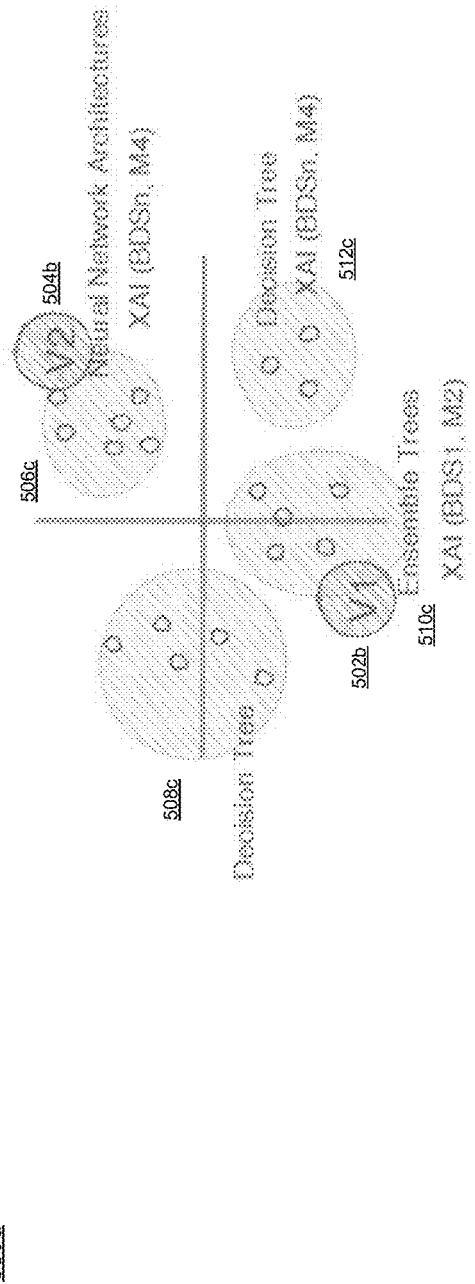
FIG. 5D illustrates an exemplary graphical user interface that illustrates a strategy for model inference based on explanation fit as implemented by the platform, language, database, and cloud agnostic strategy computing module of FIG. 4 in accordance with an exemplary embodiment.

FIG. 5D illustrates an exemplary graphical user interface 500d that illustrates a strategy for model inference based on explanation fit as implemented by the platform, language, database, and cloud agnostic SCM 406 of FIG. 4 in accordance with an exemplary embodiment. For example, the SCM 406 may be configured to utilize the deep dense representation of explanation with labels in model and algorithm type as illustrated in FIG. 5C and the deep dense representation of target data versions charts as illustrated in FIG. 5B to compare and compute strategy for model selection for target data version V1 502b and target data version V2 504b based on explanation fit. The process implemented by the SCM 406 may include: applying target data version V1 502b and target data version V2 504b in the deep representation space as illustrated in FIG. 5D; retrieving the closest cluster and labels; and returning (outputting by the outputting module 428) the closest cluster and labels. For example, as illustrated in FIG. 5D, the output may include a strategy of models inference to be used all based by explanation. The first output may include version 1 V1 502b and associated cluster 510c that illustrates ensemble trees and XAI (BDS1, M2). The second output may include version 2 V2 504b and associated cluster 506c that illustrates neural network architecture and XAI (BDSn, M4).

Referring back to FIG. 4, according to exemplary embodiments, the computing module 418 may be further configured to compute a numerical representation of the explanation.

According to exemplary embodiments, in computing the strategy of model selection for each target data version, the executing module 424 may be further configured to apply each target data version in a deep representation space of the deep dense representation of each explanation with labels in the model and type of the machine learning algorithm; the retrieving module 426 may be configured to retrieve the closest cluster and the labels; and the outputting module 428 may be configured to return the closest cluster and the labels for computing strategy for model inference based on explanation fit.

According to exemplary embodiments, each of the graphical user interface 500a, 500b, 500c, and 500c may be the same or similar to the GUI 442 which may be utilized to display the charts or explanations disclosed herein.

Figure 6:
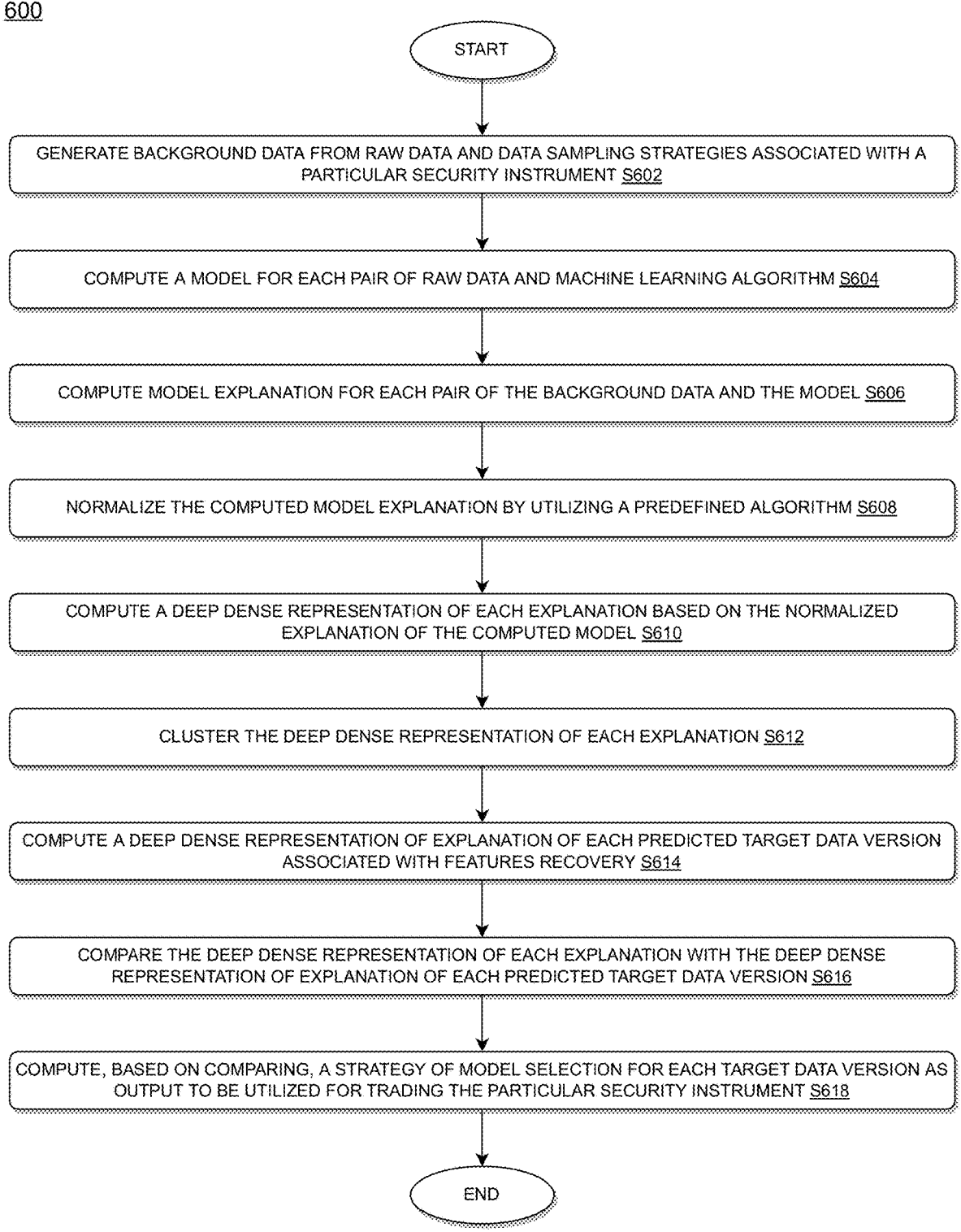
FIG. 6 illustrates an exemplary flow diagram implemented by the platform, language, database, and cloud agnostic strategy computing module of FIG. 4 for computing strategies for comparing and selecting models to be used based on explanation to limit risks in accordance with an exemplary embodiment.

FIG. 6 illustrates an exemplary flow chart 600 implemented by the platform, language, database, and cloud agnostic SCM 406 of FIG. 4 for computing strategies for comparing and selecting models to be used based on explanation to limit risks in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include generating background data from raw data and data sampling strategies associated with a particular security instrument.

At step S604, the process 600 may include computing a model for each pair of raw data and machine learning algorithm.

At step S606, the process 600 may include computing model explanation for each pair of the background data and the model.

At step S608, the process 600 may include normalizing the computed model explanation by utilizing a predefined algorithm.

At step S610, the process 600 may include computing a deep dense representation of each explanation based on the normalized explanation of the computed model.

At step S612, the process 600 may include clustering the deep dense representation of each explanation.

At step S614, the process 600 may include computing a deep dense representation of explanation of each predicted target data version associated with features recovery.

At step S616, the process 600 may include comparing the deep dense representation of each explanation with the deep dense representation of explanation of each predicted target data version.

At step S618, the process 600 may include computing, based on comparing, a strategy of model selection for each target data version as output to be utilized for trading the particular security instrument.

According to exemplary embodiments, in clustering the deep dense representation of each explanation, the process 600 may further include: computing clusters of explanations by clustering the deep dense representation of each explanation; reducing dimensionality of the computed clusters for visualization; and computing most common labels representing the deep explanation representation.

According to exemplary embodiments, in the process 600, the predefined algorithm for normalizing the computed model explanation may include one or more of the following algorithms: average, moving average, median, and weighted distance, but the disclosure is not limited thereto.

According to exemplary embodiments, the process 600 may further include: computing a numerical representation of the explanation.

According to exemplary embodiments, in the process 600, the numerical representation is a tensor representation.

According to exemplary embodiments, in computing the strategy of model selection for each target data version, the process 600 may further include: applying each target data version in a deep representation space of the deep dense representation of each explanation with labels in the model and type of the machine learning algorithm; retrieving the closest cluster and the labels; and returning the closest cluster and the labels for computing strategy for model inference based on explanation fit.

According to exemplary embodiments, in the process 600, the machine learning algorithm may include one or more of the following algorithms: decision tree, ensemble trees, neural network architectures, and liner regression, but the disclosure is not limited thereto.

According to exemplary embodiments, in features recovery, the process 600 may further include: pre-processing the raw data and each version of the target data when it is determined that features or characteristics or dimensions of data are added or removed.

According to exemplary embodiments, when it is determined that the features or characteristics or dimensions are added, the process 600 may further include: selecting features or characteristics or dimensions which are not in the target data, but are in the raw data; removing extra features or characteristics or dimensions from the target data except for the selected features or characteristics or dimensions which are not in the target data, but are in the raw data.

According to exemplary embodiments, when it is determined that the features or characteristics or dimensions are added, the process 600 may further include: transforming the raw data by filling the raw data with the added features or characteristics or dimensions; finding closest points in the raw data; and assigning similar features values or characteristics values or dimensions values to the closest points as target data.

According to exemplary embodiments, when it is determined that the features or characteristics or dimensions are added, the process 600 may further include: transforming the raw data by filling the raw data with the added features or characteristics or dimensions; finding closest points in the raw data; and assigning dummy value to all non-closest points in the raw data.

According to exemplary embodiments, when it is determined that the features or characteristics or dimensions are removed, the process 600 may further include: selecting features or characteristics or dimensions that are not in the target data, but are in the raw data; and training a model from the raw data that predicts the features or characteristics or dimensions that are not in the target data, but are in the raw data.

According to exemplary embodiments, the SCD 402 may include a memory (e.g., a memory 106 as illustrated in FIG. 1) which may be a non-transitory computer readable medium that may be configured to store instructions for implementing a platform, language, database, and cloud agnostic SCM 406, for computing strategies for model inferences as disclosed herein. The SCD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SCM 406, or within the SCD 402, may be used to perform one or more of the methods and processes as described herein. In a particular embodiment, the instructions may reside completely, or at least partially, within the memory 106, the medium reader 112, and/or the processor 104 (see FIG. 1) during execution by the SCD 402.

According to exemplary embodiments, the instructions, when executed, may cause the processor 104 embedded within the SCM 406, or the SCD 402 to perform the following: generating background data from raw data and data sampling strategies associated with a particular security instrument; computing a model for each pair of raw data and machine learning algorithm; computing model explanation for each pair of the background data and the model; normalizing the computed model explanation by utilizing a predefined algorithm; computing a deep dense representation of each explanation based on the normalized explanation of the computed model; clustering the deep dense representation of each explanation; computing a deep dense representation of explanation of each predicted target data version associated with features recovery; comparing the deep dense representation of each explanation with the deep dense representation of explanation of each predicted target data version; and computing, based on comparing, a strategy of model selection for each target data version as output to be utilized for trading the particular security instrument.

According to exemplary embodiments, in clustering the deep dense representation of each explanation, the instructions, when executed, may cause the processor 104 to further perform the following: computing clusters of explanations by clustering the deep dense representation of each explanation; reducing dimensionality of the computed clusters for visualization; and computing most common labels representing the deep explanation representation.

According to exemplary embodiments, the instructions, when executed, may cause the processor 104 to further perform the following: computing a numerical representation of the explanation.

According to exemplary embodiments, in computing the strategy of model selection for each target data version, the instructions, when executed, may cause the processor 104 to further perform the following: applying each target data version in a deep representation space of the deep dense representation of each explanation with labels in the model and type of the machine learning algorithm; retrieving the closest cluster and the labels; and returning the closest cluster and the labels for computing strategy for model inference based on explanation fit.

According to exemplary embodiments, in features recovery, the instructions, when executed, may cause the processor 104 to further perform the following: pre-processing the raw data and each version of the target data when it is determined that features or characteristics or dimensions of data are added or removed.

According to exemplary embodiments, when it is determined that the features or characteristics or dimensions are added, the instructions, when executed, may cause the processor 104 to further perform the following: selecting features or characteristics or dimensions which are not in the target data, but are in the raw data; removing extra features or characteristics or dimensions from the target data except for the selected features or characteristics or dimensions which are not in the target data, but are in the raw data.

According to exemplary embodiments, when it is determined that the features or characteristics or dimensions are added, the instructions, when executed, may cause the processor 104 to further perform the following: transforming the raw data by filling the raw data with the added features or characteristics or dimensions; finding closest points in the raw data; and assigning similar features values or characteristics values or dimensions values to the closest points as target data.

According to exemplary embodiments, when it is determined that the features or characteristics or dimensions are added, the instructions, when executed, may cause the processor 104 to further perform the following: transforming the raw data by filling the raw data with the added features or characteristics or dimensions; finding closest points in the raw data; and assigning dummy value to all non-closest points in the raw data.

According to exemplary embodiments, when it is determined that the features or characteristics or dimensions are removed, the instructions, when executed, may cause the processor 104 to further perform the following: selecting features or characteristics or dimensions that are not in the target data, but are in the raw data; and training a model from the raw data that predicts the features or characteristics or dimensions that are not in the target data, but are in the raw data.

According to exemplary embodiments as disclosed above in FIGS. 1-6, technical improvements effected by the instant disclosure may include a platform for implementing a platform, language, database, and cloud agnostic strategy computing module configured to compute strategies for comparing and selecting models to be used based on explanation to limit risks, i.e., in generating bond pricing or in predicting stock pricing, but the disclosure is not limited thereto. According to exemplary embodiments as disclosed above in FIGS. 1-6, technical improvements effected by the instant disclosure may include a platform for implementing a platform, language, database, and cloud agnostic strategy computing module configured to generate output data that may include differentiating factors, demonstrating gaps, limitations among models, and recommendation of models to be used to limit the risks associated with investment performance, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replSCMent standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for computing strategies for model inferences by utilizing one or more processors along with allocated memory, the method comprising:
   generating background data from raw data and data sampling strategies associated with a particular security instrument;
computing a model for each pair of raw data and machine learning algorithm;
   computing model explanation for each pair of the background data and the model;
   normalizing the computed model explanation by utilizing a predefined algorithm;
   computing a deep dense representation of each explanation based on the normalized explanation of the computed model;
   clustering the deep dense representation of each explanation;
   computing a deep dense representation of explanation of each predicted target data version associated with features recovery, wherein in features recovery, the method further comprising: pre-processing the raw data and said each predicted target data version when it is determined that features or characteristics or dimensions of data are added or removed, and when it is determined that the features or characteristics or dimensions are added, the method further comprising: transforming the raw data by filling the raw data with the added features or characteristics or dimensions; finding closest points in the raw data; and assigning similar features values or characteristics values or dimensions values to the closest points as target data;
   comparing the deep dense representation of each explanation with the deep dense representation of explanation of said each predicted target data version; and
   computing, based on comparing, a strategy of model selection for said each predicted target data version as output to be utilized for trading the particular security instrument.

2. The method according to claim 1, wherein in clustering the deep dense representation of each explanation, the method may further include:
   computing clusters of explanations by clustering the deep dense representation of each explanation;
   reducing dimensionality of the computed clusters for visualization; and
   computing most common labels representing the deep explanation representation.

3. The method according to claim 1, wherein the predefined algorithm for normalizing the computed model explanation includes one or more of the following algorithms: average, moving average, median, and weighted distance.

4. The method according to claim 3, further comprising:
   computing a numerical representation of the explanation.

5. The method according to claim 4, wherein the numerical representation is a tensor representation.

6. The method according to claim 1, wherein, in computing the strategy of model selection for said each predicted target data version, the method further comprising:
   applying said each predicted target data version in a deep representation space of the deep dense representation of each explanation with labels in the model and type of the machine learning algorithm;
   retrieving the closest cluster and the labels; and
   returning the closest cluster and the labels for computing strategy for model inference based on explanation fit.

7. The method according to claim 1, wherein the machine learning algorithm includes one or more of the following algorithms: decision tree, ensemble trees, neural network architectures, and liner regression.

8. The method according to claim 1, further comprising:
   selecting features or characteristics or dimensions which are not in the target data, but are in the raw data; and
   removing extra features or characteristics or dimensions from the target data except for the selected features or characteristics or dimensions which are not in the target data, but are in the raw data.

9. The method according to claim 1,
   assigning dummy value to all non-closest points in the raw data.

10. The method according to claim 1, wherein when it is determined that the features or characteristics or dimensions are removed, the method further comprising:
    selecting features or characteristics or dimensions that are not in the target data, but are in the raw data; and
    training a model from the raw data that predicts the features or characteristics or dimensions that are not in the target data, but are in the raw data.

11. A system for computing strategies for model inferences, the system comprising:
    a processor; and
    a memory operatively connected to the processor via a communication interface, the memory storing computer readable instructions, when executed, causes the processor to:
    generate background data from raw data and data sampling strategies associated with a particular security instrument;
    compute a model for each pair of raw data and machine learning algorithm;

compute model explanation for each pair of the background data and the model;

normalize the computed model explanation by utilizing a predefined algorithm;

compute a deep dense representation of each explanation based on the normalized explanation of the computed model;

cluster the deep dense representation of each explanation;

compute a deep dense representation of explanation of each predicted target data version associated with features recovery, wherein in features recovery, the processor is further configured to: pre-process the raw data and said each predicted target data version when it is determined that features or characteristics or dimensions of data are added or removed, and when it is determined that the features or characteristics or dimensions are added, the processor is further configured to: transform the raw data by filling the raw data with the added features or characteristics or dimensions; find closest points in the raw data; and assign similar features values or characteristics values or dimensions values to the closest points as target data;

compare the deep dense representation of each explanation with the deep dense representation of explanation of said each predicted target data version; and compute, based on comparing, a strategy of model selection for said each predicted target data version as output to be utilized for trading the particular security instrument.

12. The system according to claim 11, in clustering the deep dense representation of each explanation, the processor is further configured to:

compute clusters of explanations by clustering the deep dense representation of each explanation;

reduce dimensionality of the computed clusters for visualization; and compute most common labels representing the deep explanation representation.

13. The system according to claim 11, wherein the predefined algorithm for normalizing the computed model explanation includes one or more of the following algorithms: average, moving average, median, and weighted distance.

14. The system according to claim 11, in computing the strategy of model selection for said each predicted target data version, the processor is further configured to:

apply said each predicted target data version in a deep representation space of the deep dense representation of each explanation with labels in the model and type of the machine learning algorithm;

retrieve the closest cluster and the labels; and return the closest cluster and the labels for computing strategy for model inference based on explanation fit.

15. The system according to claim 11, wherein the processor is further configured to:

select features or characteristics or dimensions which are not in the target data, but are in the raw data; and remove extra features or characteristics or dimensions from the target data except for the selected features or characteristics or dimensions which are not in the target data, but are in the raw data.

16. A non-transitory computer readable medium configured to store instructions for computing strategies for model inferences, the instructions, when executed, cause a processor to perform the following:

generating background data from raw data and data sampling strategies associated with a particular security instrument;

computing a model for each pair of raw data and machine learning algorithm;

computing model explanation for each pair of the background data and the model;

normalizing the computed model explanation by utilizing a predefined algorithm;

computing a deep dense representation of each explanation based on the normalized explanation of the computed model;

clustering the deep dense representation of each explanation;

computing a deep dense representation of explanation of each predicted target data version associated with features recovery, wherein in features recovery, the instructions, when executed, cause the processor to further perform the following: pre-processing the raw data and said each predicted target data version when it is determined that features or characteristics or dimensions of data are added or removed, and when it is determined that the features or characteristics or dimensions are added, the instructions, when executed, cause the processor to further perform the following: transforming the raw data by filling the raw data with the added features or characteristics or dimensions; finding closest points in the raw data; and assigning similar features values or characteristics values or dimensions values to the closest points as target data;

comparing the deep dense representation of each explanation with the deep dense representation of explanation of said each predicted target data version; and computing, based on comparing, a strategy of model selection for said each predicted target data version as output to be utilized for trading the particular security instrument.

17. The non-transitory computer readable medium according to claim 16, wherein in clustering the deep dense representation of each explanation, the instructions, when executed, cause the processor to further perform the following:

computing clusters of explanations by clustering the deep dense representation of each explanation;

reducing dimensionality of the computed clusters for visualization; and computing most common labels representing the deep explanation representation.

18. The non-transitory computer readable medium according to claim 16, wherein the predefined algorithm for normalizing the computed model explanation includes one or more of the following algorithms: average, moving average, median, and weighted distance.

19. The non-transitory computer readable medium according to claim 18, wherein the instructions, when executed, cause the processor to further perform the following:

computing a numerical representation of the explanation.

20. The non-transitory computer readable medium according to claim 19, wherein the numerical representation is a tensor representation.

* * * * *